US012728899B2

(12) United States Patent
Wearmouth

(10) Patent No.: US 12,728,899 B2
(45) Date of Patent: Sep. 8, 2026

(54) FOLDABLE STAIR ASSEMBLY

(71) Applicant: SAFESMART, LLC, Santa Fe Springs, CA (US)

(72) Inventor: Shane Joseph Wearmouth, Los Angeles, CA (US)

(73) Assignee: SAFESMART, LLC, Santa Fe Springs, CA (US)

( * ) Notice: Subject to any disclaimer, the term of this patent is extended or adjusted under 35 U.S.C. 154(b) by 136 days.

(21) Appl. No.: 18/903,475

(22) Filed: Oct. 1, 2024

(65) Prior Publication Data

US 2025/0215694 A1 Jul. 3, 2025

Related U.S. Application Data

(60) Provisional application No. 63/617,163, filed on Jan. 3, 2024.

(51) Int. Cl.

| | |
|---|---|
| ***B61D 23/02*** | (2006.01) |
| ***E04F 11/06*** | (2006.01) |
| ***E04F 11/104*** | (2006.01) |
| ***E06C 1/36*** | (2006.01) |
| ***E06C 1/383*** | (2006.01) |
| ***E06C 5/04*** | (2006.01) |
| ***E06C 5/24*** | (2006.01) |
| ***E06C 7/18*** | (2006.01) |

(52) U.S. Cl.

CPC .............. *B61D 23/02* (2013.01); *E04F 11/06* (2013.01); *E04F 11/062* (2013.01); *E04F 11/104* (2013.01); *E06C 1/36* (2013.01); *E06C 1/383* (2013.01); *E06C 5/04* (2013.01); *E06C 5/24* (2013.01); *E06C 7/182* (2013.01); *E06C 7/183* (2013.01)

(58) Field of Classification Search

CPC ........ B61D 23/02; E04F 11/06; E04F 11/062; E04F 11/104; E06C 1/36; E06C 1/383; E06C 5/04; E06C 5/24; E06C 7/18; E06C 7/182

See application file for complete search history.

(56) References Cited

U.S. PATENT DOCUMENTS 381,429 A * 4/1888 Scott .......................... E06C 1/52 182/163
2,551,345 A * 5/1951 Scott ........................ B63B 27/14 105/326
5,333,323 A * 8/1994 Aymes .................... E06C 7/183 4/496

(Continued)

FOREIGN PATENT DOCUMENTS

CN 108749836 A 11/2018
CN 111098872 A * 5/2020 ............. B61D 23/02

(Continued)

*Primary Examiner* — Jessie T Fonseca
(74) *Attorney, Agent, or Firm* — Luedeka Neely, P.C.

(57) ABSTRACT

A foldable stair assembly and emergency escape stairway kit. The foldable stair assembly includes a first tread section hingedly attached on a first end to a first end of a second tread section. Each of the first tread section and second tread section includes two or more treads attached to left and right rails. A mounting bracket is attached to on a distal end of the left and right rails of the second tread section. Flexible straps are attached to distal ends of the left and right rails of the first tread section.

15 Claims, 6 Drawing Sheets

(56) References Cited

U.S. PATENT DOCUMENTS

| | | | | |
|---|---|---|---|---|
| 6,401,861 | B1 * | 6/2002 | Marszalek | E06C 9/08 182/86 |
| 10,487,577 | B1 * | 11/2019 | Fuqua | E06C 1/383 |
| 2003/0127288 | A1 * | 7/2003 | Ed | E06C 1/38 182/206 |
| 2010/0096215 | A1 * | 4/2010 | McFarlane | E06C 7/182 182/127 |
| 2012/0211305 | A1 * | 8/2012 | Moss | E06C 1/39 182/180.1 |
| 2018/0347278 | A1 * | 12/2018 | Russell | E06C 7/50 |
| 2019/0351832 | A1 * | 11/2019 | Fuller | E06C 5/36 |

FOREIGN PATENT DOCUMENTS

| | | | | | |
|---|---|---|---|---|---|
| CN | 111098873 | A | * | 5/2020 | B61D 23/02 |
| CN | 111469875 | A | * | 7/2020 | B61D 19/023 |
| CN | 217994422 | U | * | 12/2022 | |
| GB | 2455333 | A | * | 6/2009 | B61D 23/02 |
| JP | 2003291805 | A | | 10/2003 | |
| KR | 20120115735 | A | | 10/2012 | |
| KR | 102143866 | B1 | * | 8/2020 | E06C 7/08 |
| WO | WO-2020123905 | A1 | * | 6/2020 | E06C 7/50 |

* cited by examiner

FOLDABLE STAIR ASSEMBLY

RELATED APPLICATION

This application claims priority to provisional application No. 63/617,163, filed Jan. 3, 2024.

FIELD OF THE INVENTION

The disclosure is directed to a folding stair assembly and in particular to a light-weight folding stair assembly for deboarding a rail car.

BACKGROUND AND SUMMARY

There is a need for a light-weight stair assembly that can be deployed readily in the case of an emergency and that can be easily stowed without requiring excessive storage room. In particular, there is a need for a light-weight stowable stair assembly that can be used as an emergency escape from a rear of a railcar.

In view of the foregoing needs, an embodiment of the disclosure provides a foldable stair assembly. The foldable stair assembly includes a first tread section hingedly attached on a first end to a first end of a second tread section, wherein each of the first tread section and second tread section includes two or more treads attached to left and right rails. A mounting bracket is attached to a distal end of the left and right rails of the second tread section. Flexible straps are attached to distal ends of the left and right rails of the first tread section.

In another embodiment there is provided an emergency escape stairway kit. The stairway kit includes a foldable stair assembly having a first tread section hingedly attached on a first end to a first end of a second tread section, wherein each of the first tread section and second tread section includes two or more treads attached to left and right rails. A mounting bracket is attached to on a distal end of the left and right rails of the second tread section. Flexible straps are attached to distal ends of the left and right rails of the first tread section. A storage container is provided for the foldable stair assembly.

In some embodiments, switch buckle hinges are attached to the first and second rails between the first tread section and the second tread section.

In some embodiments, the foldable stair assembly weighs less than about 20 kilograms.

In some embodiments, the foldable stair assembly has a total step height from ground level to top level ranging from about 100 to about 150 centimeters.

In some embodiments, the foldable stair assembly has an overall width ranging from about 80 to about 100 centimeters.

In some embodiments, the foldable stair assembly has a tread width ranging from about 50 to about 65 centimeters.

In some embodiments, the foldable stair assembly has a folded height ranging from about 90 to about 115 centimeters.

In some embodiments, the foldable stair assembly has a folded width ranging from about 25 to about 35 centimeters.

An advantage of the foldable stair assembly of the disclosure is that the foldable design is configured to fit in a custom storage box with minimal disturbance of the layout of a typical railcar. Another advantage of the foldable stair assembly is that the entire stair assembly weight less than 20 kilograms and thus can be deployed from the rear of a railcar by one person in less than a minute.

DETAILED DESCRIPTION OF EMBODIMENTS OF THE DISCLOSURE

Figure 1:
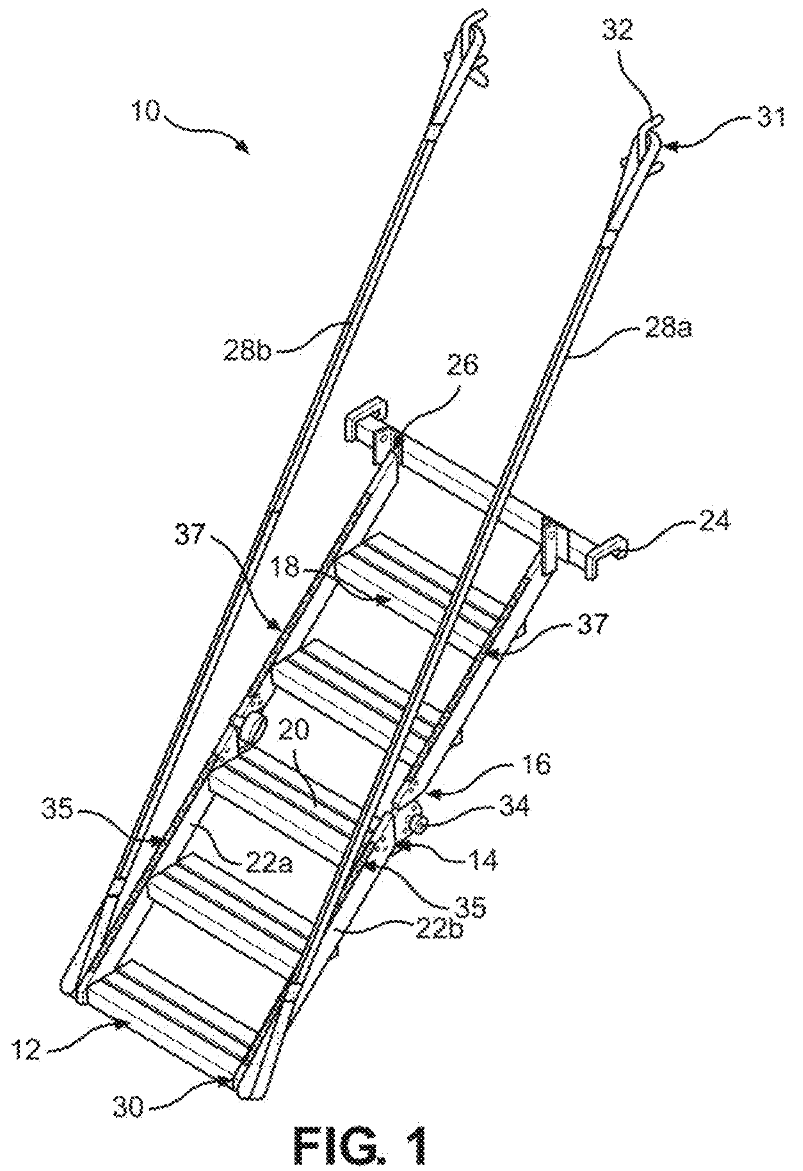
FIG. 1 is a perspective view, not to scale, of a foldable stair assembly according to the disclosure.
Figure 2:
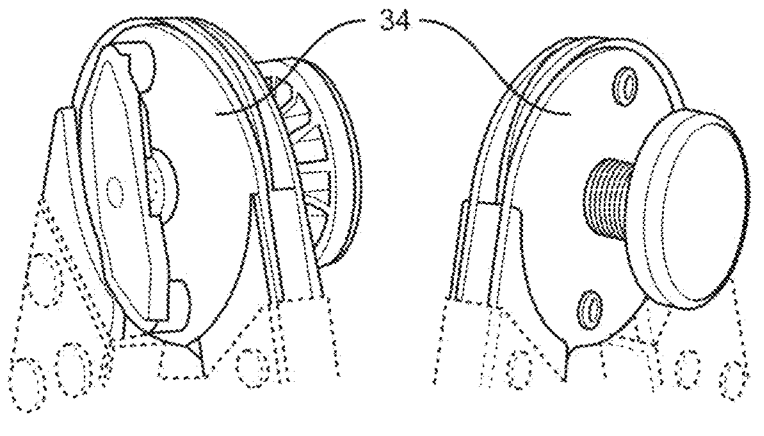
FIG. 2 is a plan view, not to scale of switch buckle hinges for use with the foldable stair assembly of FIG. 1.

Further details of the foldable stair assembly may be determined by reference to the attached drawings. FIG. 1 is a perspective view of the foldable stair assembly 10 according to an embodiment of the disclosure. The foldable stair assembly includes a first tread section 12 hingedly attached on a first end 14 to a first end 16 of a second tread section 18. Each of the first and second stair tread sections 12 and 18 include two or more treads 20 attached to left and right rails 22*a* and 22*b*. A mounting bracket 24 is attached to a distal end 26 of the left and right rails 22*a* and 22*b* of the second tread section 18. Flexible straps 28*a* and 28*b* are attached to distal ends 30 of the left and right rails 22*a* and 22*b* of the first tread section 12. The flexible straps 28*a* and 28*b* may be made from leather, ropes, chains, or any other light-weight, durable, flexible material Distal ends 31 of the straps 28*a* and 28*b* are configured to engage grab handles 32 on the railcar. The hinges 34, shown in more detail in FIG. 2 may be selected spring-loaded locking hinges 34 or from switch buckle hinges that are attached to the first end of the first tread section 12 and the first end 16 of the second tread section 18. In some embodiments, edges of the left and right rails 22*a* and 22*b* may include hook and loop strips 35/37 to help maintain the foldable stair assembly 10 in a folded orientation for storage.

Figure 3:
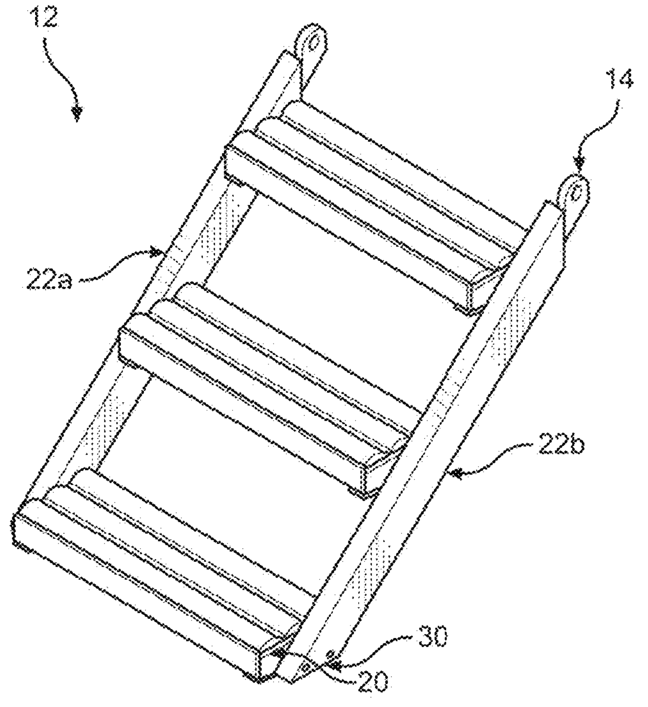
FIG. 3 is a perspective view, not to scale, of a first stair tread section for the foldable stair assembly of FIG. 1.
Figure 4:
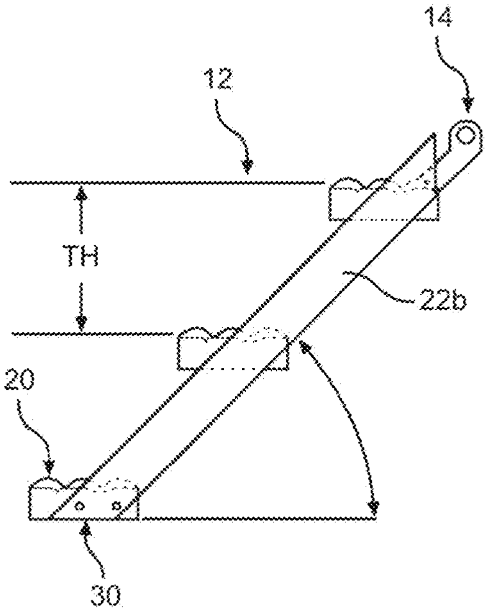
FIG. 4 is an elevational view, not to scale, of the first stair tread section of FIG. 3.

Further details of the first tread section 12 are illustrated in FIGS. 3 and 4. As shown in FIG. 4, the first stair tread section 12 includes three treads 20 and each tread 20 may be spaced-apart from an adjacent tread a distance TH of about 24 centimeters. Also, the first stair tread 12 may make an angle with respect to a ground location of about 45 degrees.

Figure 5:
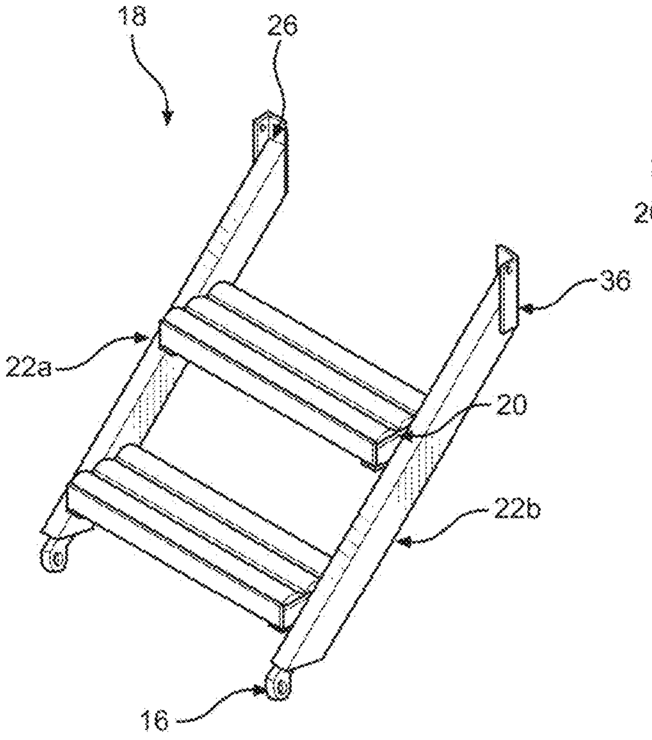
FIG. 5 is a perspective view, not to scale, of a second stair tread section for the foldable stair assembly of FIG. 1.
Figure 6:
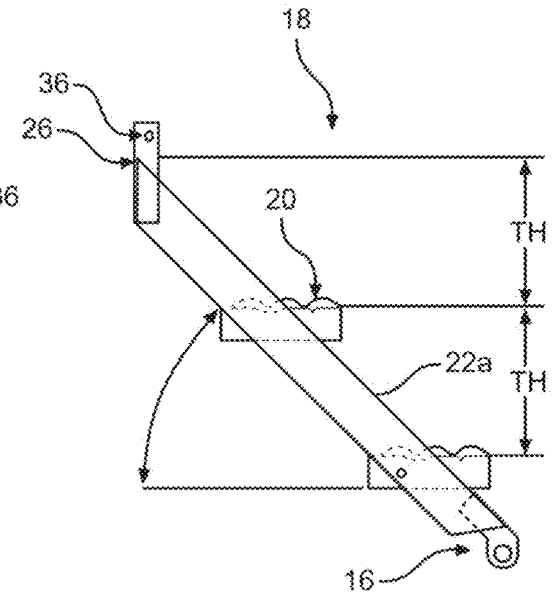
FIG. 6 is an elevational view, not to scale, of the second stair tread section of FIG. 5.

Further details of the second tread section 18 are illustrated in FIGS. 5 and 6. As shown in FIG. 5, the second tread section 18 include only two treads 20 and the two treads 20 are spaced-apart a distance TH of about 24 centimeters. The distal end 26 of the second tread section 18 includes an angle iron bracket 36 for attaching the mounting bracket 24 to the left and right rails 22*a* and 22*b*. Accordingly, the distance TH between the tread 20 and the mounting bracket is also about 24 centimeters. The second tread section 18 also makes an angle of 45 degrees with respect to the ground.

Figure 7:
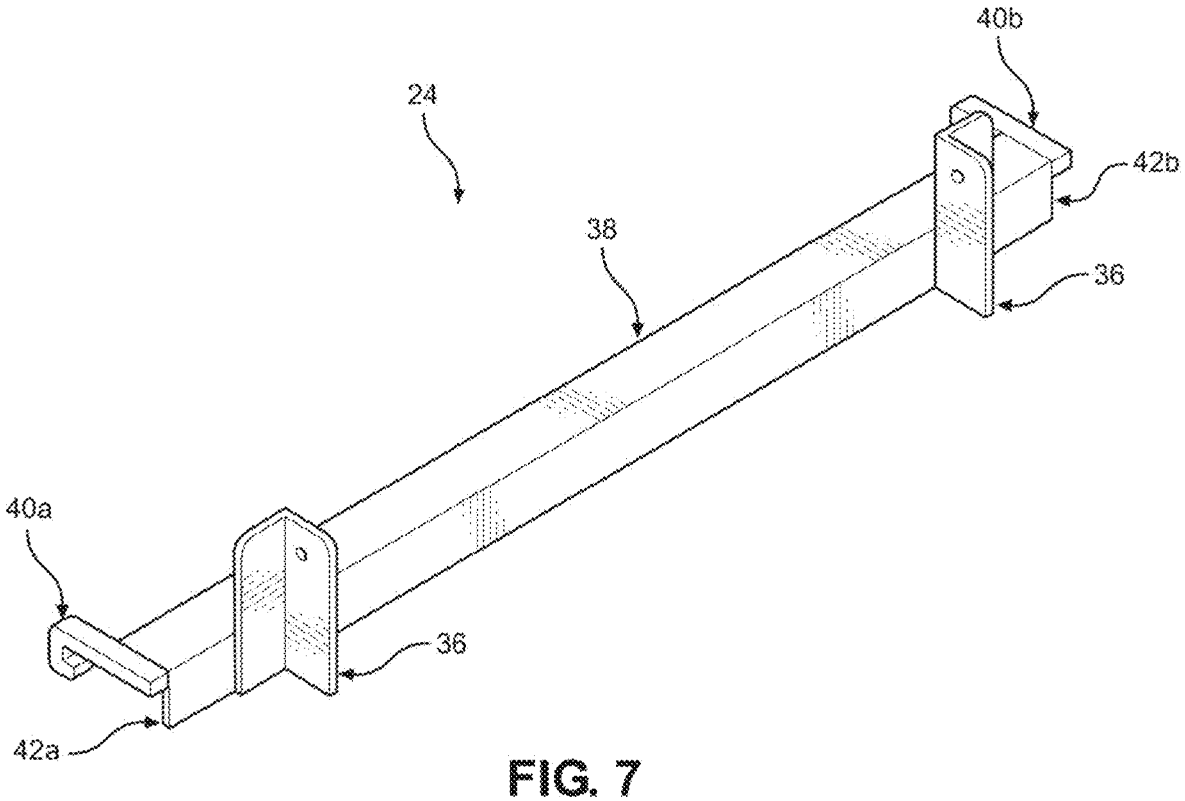
FIG. 7 is a perspective view, not to scale, of a mounting bracket for the foldable stair assembly of FIG. 1.
Figure 8:
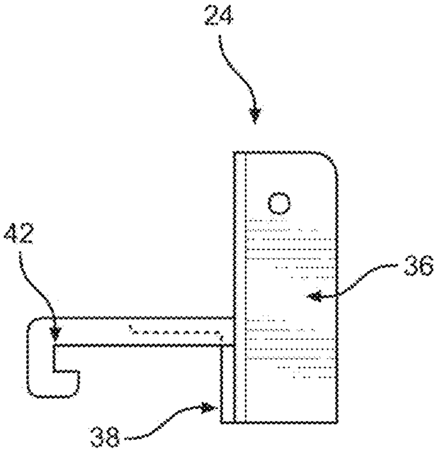
FIG. 8 is a side elevational view, not to scale, of the mounting bracket of FIG. 7.

Further details of the mounting bracket 24 for mounting the foldable stair assembly on a pressure plate of a railcar are shown in FIGS. 7 and 8. The mounting bracket 24 includes an elongate angle iron section 38 having the angle irons brackets 36 attached thereto for attaching the mounting bracket 24 to the left and right rails 22*a* and 22*b* of the foldable stair assembly 10. The mounting bracket 24 also includes hooks 40*a* and 40*b* attached to opposing ends 42*a* and 42*b* of the elongate angle iron section 38. The hooks 42*a* and 42*b* are configured to positively engage a pressure plate of a railcar when the foldable stair assembly is deployed in an operable condition to allow egress from the railcar.

Figure 9:
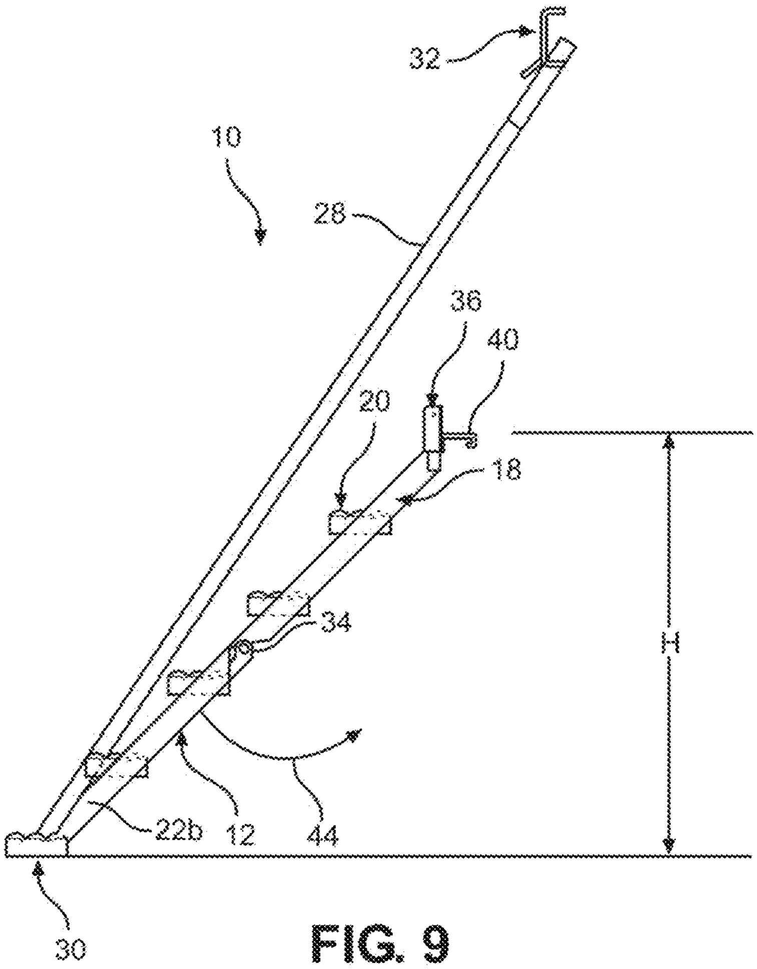
FIG. 9 is a side elevational view, not to scale, of the foldable stair assembly of FIG. 1.
Figure 10:
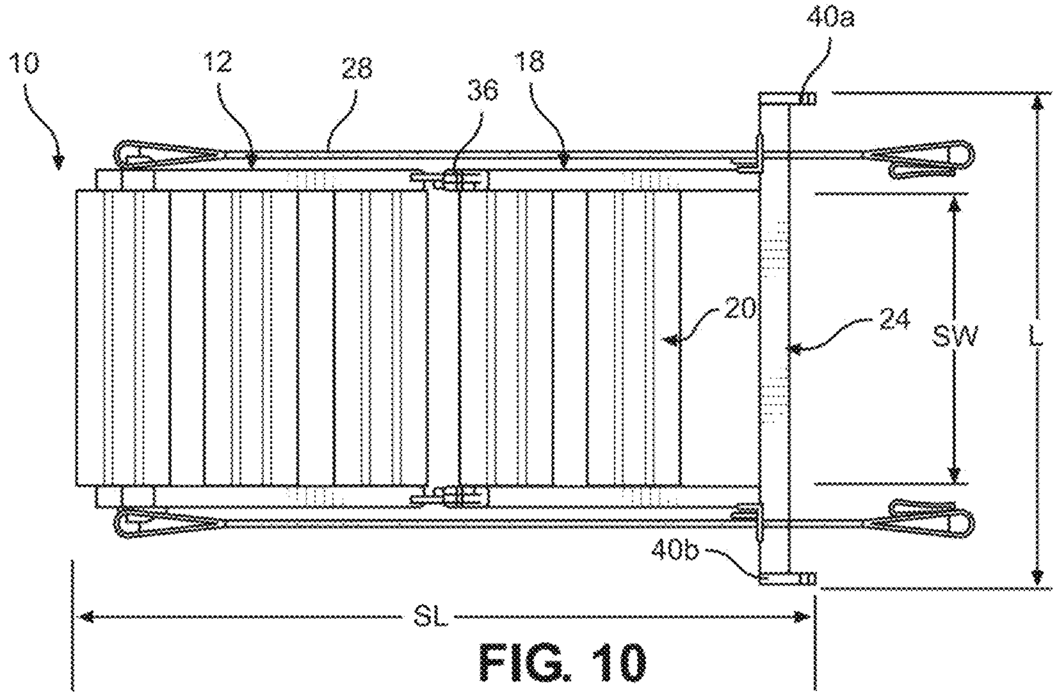
FIG. 10. Is a top plane view, not to scale, of the foldable stair assembly of FIG. 1.

Further details of the foldable stair assembly 10 are illustrated in FIGS. 9-10. FIG. 9 is an elevational view, not to scale, of the foldable stair assembly 10 showing the overall height H of the foldable stair assembly 10 ranging from about 100 to about 150 centimeters. The flexible straps 28 may be adjustable to engage the grab handles 32 and thus the length of the straps 28 is not critical. The width SW of the stair treads 20 may range from about 50 to about 65 centimeters. The length L of the mounting bracket may range from about 80 to about 100 centimeters. The overall length SL of the stair assembly may range from about 127 centimeters to about 150 centimeters. The flexible straps 28 may be attached to the foldable stair assembly 10 and to the grab handles 32 using hook and loop fasteners (not shown).

Figure 11:
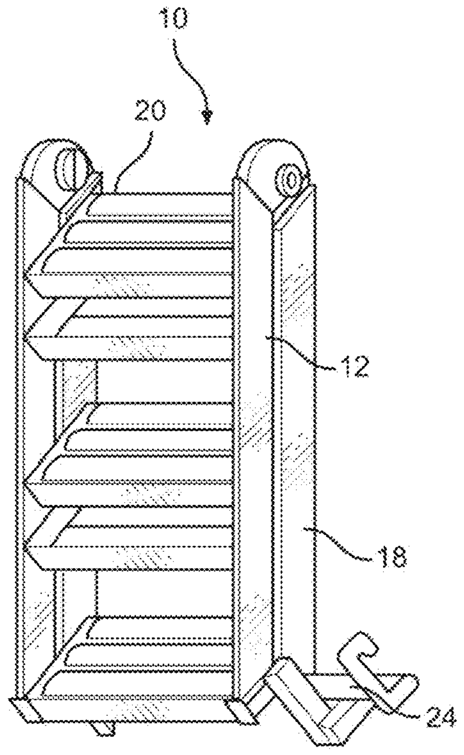
FIG. 11 is a perspective view, not to scale, of the foldable stair assembly of FIG. 1 in the folded state.
Figure 13:
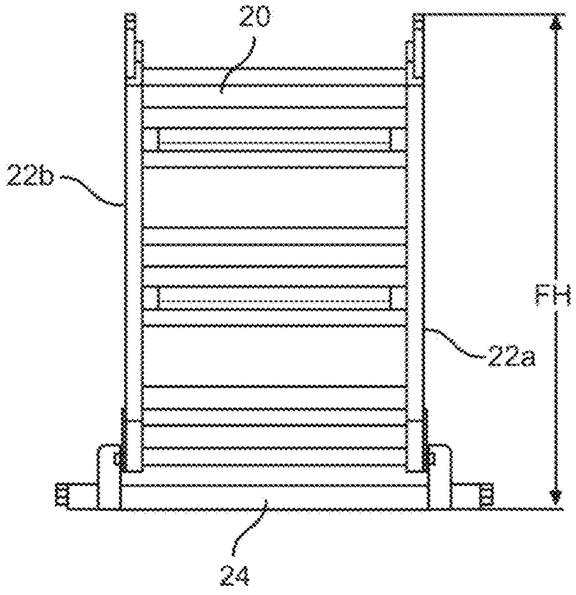
FIG. 13 is a front elevational view, not to scale, of the foldable stair assembly of FIG. 11.
Figure 12:
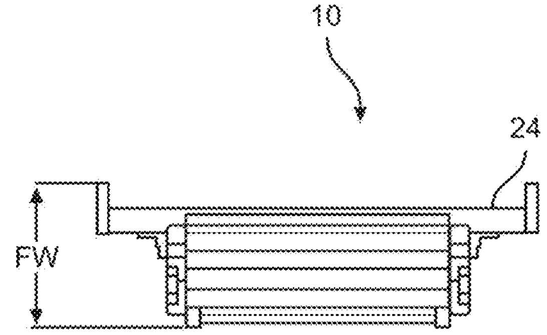
FIG. 12 is a top plan view, not to scale, of the foldable stair assembly of FIG. 11.

In order to easily store the foldable stair assembly 10 for storage, the first stair tread section 12 is rotated in the direction of arrow 44 (FIG. 9) toward the second stair tread section 18 as shown in FIG. 11. The resulting foldable stair assembly 10 has a folded width FW ranging from about 25 to about 35 centimeters as shown in FIG. 12 and a folded height FH ranging from about 90 to about 115 centimeters as shown in FIG. 13.

In order to provide a light-weight foldable stair assembly 10, major structural components of the stair assembly 10, other than the flexible straps 28 and buckle hinges 34, are made of aluminum. The treads 20 are made of aluminum grating. Accordingly, the foldable stair assembly has a weight of less than 20 kilograms, such as a weight ranging from about 15 to about 18 kilograms. The rated design load for the foldable stair assembly is for up to 4 persons weighing 115 kilograms each. The appearance of the foldable stair assembly 10 is also configured to be aesthetically pleasing and includes various ornamental aspects and features.

Figure 14:
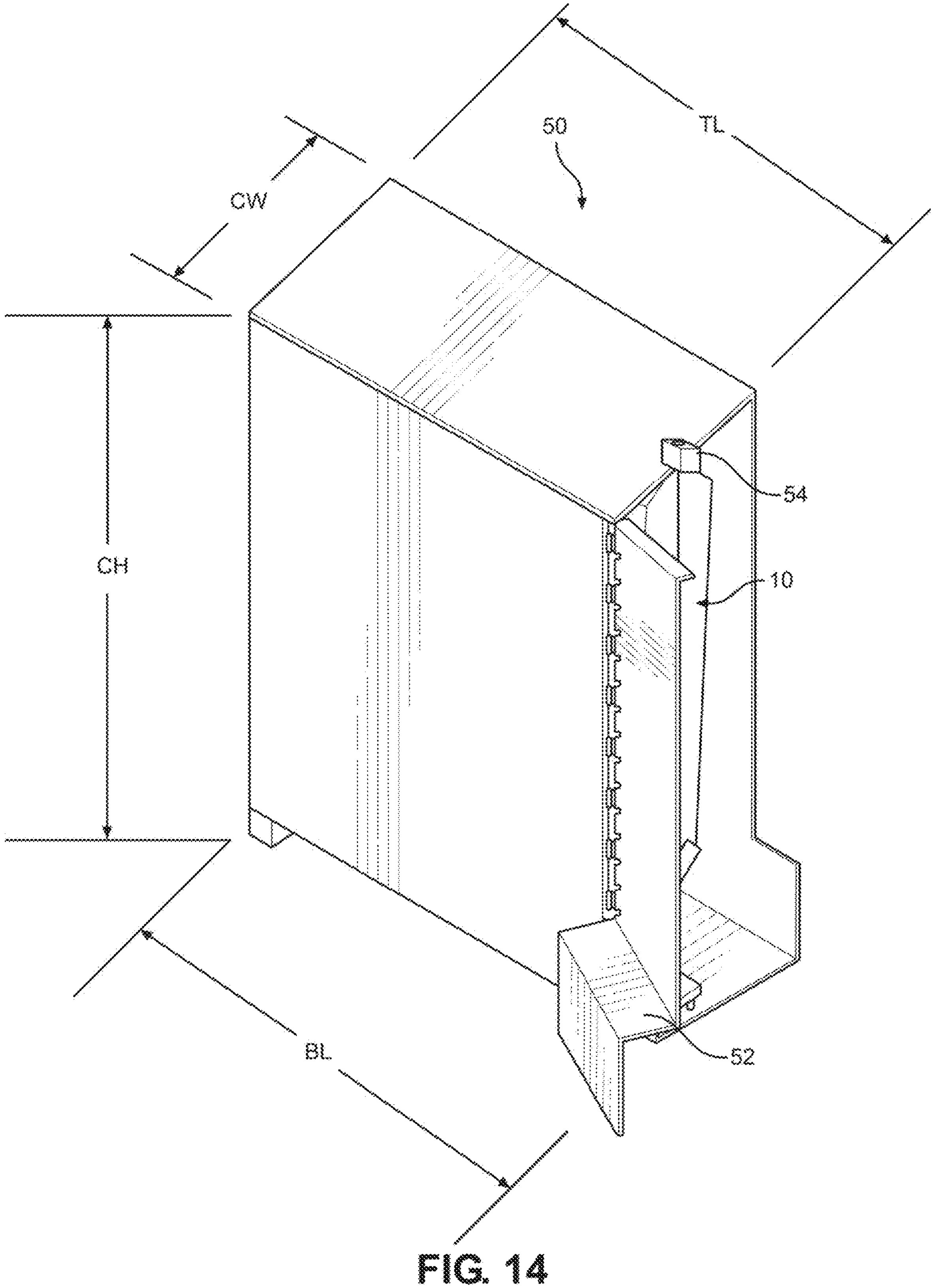
FIG. 14 is a perspective view, not to scale, of a storage crate for the foldable stair assembly of FIG. 1.

Due to the compact size of the foldable stair assembly 10 in the folded state, a small storage crate 50 (FIG. 14) may be provided on the railcar to store the foldable stair assembly 10 when not in use. The storage crate 50 has an overall height CH ranging from about 100 to about 115 centimeters, an overall width CW ranging from about 40 to about 55 centimeters, a top length TL ranging from about 75 to about 90 centimeters, and a bottom length BL ranging from about 90 to about 100 centimeters. The storage crate 50 has a hinged door 52 that may be closed and latched with a latch

54. Accordingly, the storage crate 50 may take up little space on the railcar while providing ready access to the foldable staircase 10.

The foregoing description of preferred embodiments have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A foldable stair assembly for a railcar comprising:

a first tread section and a second tread section each having a proximal end and a distal end, a left rail extending from the proximal end to the distal end, a right rail extending from the proximal end to the distal end opposite the left rail, and two or more treads extending from the left rail to the right rail, the distal end of the first tread section being hingedly attached to the proximal end of the second tread section;

a mounting bracket attached to the distal end of the second tread section, the mounting bracket including:

an elongate section having a first end secured to the left rail of the second tread section adjacent the distal end of the second tread section and a second end secured to the right rail of the second tread section adjacent the distal end of the second tread section, and a first hook disposed adjacent the first end of the elongate section and a second hook disposed adjacent the second end of the elongate section, the first and second hooks dimensioned and configured for engaging a pressure plate of the railcar when the foldable stair assembly is deployed in an operable condition for allowing egress from the railcar; and flexible straps attached to the left and right rails adjacent the proximal end of the first tread section, the flexible straps dimensioned and configured for engaging one or more grab handles of the railcar disposed above the pressure plate.

2. The foldable stair assembly of claim 1, wherein locking hinges are attached to the first and second rails between the first tread section and the second tread section.

3. The foldable stair assembly of claim 2, wherein the locking hinges are selected from the group consisting of switch buckles hinges and spring-loaded locking hinges.

4. The foldable stair assembly of claim 1, wherein the foldable stair assembly weighs less than about 20 kilograms.

5. The foldable stair assembly of claim 1, wherein the foldable stair assembly has a total step height from ground level to top level ranging from about 100 to about 150 centimeters.

6. The foldable stair assembly of claim 1, wherein the foldable stair assembly has an overall width ranging from about 80 to about 100 centimeters.

7. The foldable stair assembly of claim 1, wherein the foldable stair assembly has a tread width ranging from about 50 to about 65 centimeters.

8. The foldable stair assembly of claim 1, wherein the foldable stair assembly has a folded height ranging from about 90 to about 115 centimeters.

9. The foldable stair assembly of claim 1, wherein the foldable stair assembly has a folded width ranging from about 25 to about 35 centimeters.

10. The foldable stair assembly of claim 1, wherein the two or more treads of the first tread section has three treads and the two or more treads of the second tread section has two treads.

11. An emergency escape stairway kit for a railcar comprising:

a foldable stair assembly comprising:

a first tread section and a second tread section each having a proximal end and a distal end, a left rail extending from the proximal end to the distal end, a right rail extending from the proximal end to the distal end opposite the left rail, and two or more treads extending from the left rail to the right rail, the distal end of the first tread section being hingedly attached to the proximal end of the second tread section;

a mounting bracket attached to the distal end of the second tread section, the mounting bracket including:

an elongate section having a first end secured to the left rail of the second tread section adjacent the distal end of the second tread section and a second end secured to the right rail of the second tread section adjacent the distal end of the second tread section, and a first hook disposed adjacent the first end of the elongate section and a second hook disposed adjacent the second end of the elongate section, the first and second hooks dimensioned and configured for engaging a pressure plate of the railcar when the foldable stair assembly is deployed in an operable condition for allowing egress from the railcar;

flexible straps attached to the left and right rails adjacent the proximal end of the first tread section, the flexible straps dimensioned and configured for engaging one or more grab handles of the railcar disposed above the pressure plate; and a storage container for the foldable stair assembly.

12. The emergency escape stairway kit of claim 11, wherein the foldable stair assembly weighs less than about 20 kilograms.

13. The emergency escape stairway kit of claim 11, wherein the foldable stair assembly has a total step height from ground level to top level ranging from about 100 to about 150 centimeters.

14. The emergency escape stairway kit of claim 11, wherein the foldable stair assembly has an overall width ranging from about 80 to about 100 centimeters.

15. The emergency escape stairway kit of claim 11, wherein the foldable stair assembly has a folded height ranging from about 90 to about 115 centimeters and a folded width ranging from about 25 to about 35 centimeters.

* * * * *